United States Patent
Sato et al.

(10) Patent No.: US 10,035,543 B2
(45) Date of Patent: Jul. 31, 2018

(54) SIDE VEHICLE-BODY STRUCTURE OF AUTOMOTIVE VEHICLE

(71) Applicant: MAZDA MOTOR CORPORATION, Hiroshima (JP)

(72) Inventors: Kenichi Sato, Hiroshima (JP); Keizo Kawasaki, Hiroshima (JP); Yuuichi Sugimura, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 97 days.

(21) Appl. No.: 15/234,400

(22) Filed: Aug. 11, 2016

(65) Prior Publication Data
US 2017/0080979 A1 Mar. 23, 2017

(30) Foreign Application Priority Data
Sep. 18, 2015 (JP) .................... 2015-184930

(51) Int. Cl.
*B62D 21/15* (2006.01)
*B60J 5/04* (2006.01)
(Continued)

(52) U.S. Cl.
CPC .......... *B62D 21/157* (2013.01); *B60J 5/0444* (2013.01); *B62D 25/02* (2013.01); *B62D 25/2036* (2013.01)

(58) Field of Classification Search
CPC .. B62D 21/157; B62D 25/2036; B62D 25/02; B60J 5/0444
(Continued)

(56) References Cited

U.S. PATENT DOCUMENTS

| 8,141,937 B2* | 3/2012 | Tsuyuzaki | B60J 5/0425 296/146.6 |
| 8,960,768 B2* | 2/2015 | Kato | B60J 5/0458 296/146.6 |

(Continued)

FOREIGN PATENT DOCUMENTS

| JP | H05-069859 A | 3/1993 |
| JP | 2008-081035 A | 4/2008 |

(Continued)

OTHER PUBLICATIONS

An Office Action; "Notification of Reasons for Refusal," issued by the Japanese Patent Office dated Jan. 9, 2018, which corresponds to Japanese Patent Application No. 2015-184930 and is related to U.S. Appl. No. 15/234,400; with English language translation.

*Primary Examiner* — Jason S Morrow
*Assistant Examiner* — E Turner Hicks
(74) *Attorney, Agent, or Firm* — Studebaker & Brackett PC

(57) ABSTRACT

There is provided an automotive vehicle which comprises a side door, impact bars provided at the side door, a side inner panel, a first reinforcing member provided to extend along a rear side of a peripheral portion of an entrance portion and joined to an outside of the side inner panel so as to form a first closed cross section together with the side inner panel, and second reinforcing members joined to an outside of the first reinforcing member so as to form second closed cross sections together with the first reinforcing member, the second reinforcing members being configured to overlap with the impact bars, in a side view, when the side door closes the entrance portion.

17 Claims, 11 Drawing Sheets

Vehicle-Body Front Side ⟵⟶ Vehicle-Body Rear Side

(51) Int. Cl.
*B62D 25/02* (2006.01)
*B62D 25/20* (2006.01)

(58) Field of Classification Search
USPC .............. 296/146.9, 187.12, 193.05, 202, 30
See application file for complete search history.

(56) References Cited

U.S. PATENT DOCUMENTS

| | | | |
|---|---|---|---|
| 9,061,708 B2* | 6/2015 | Sugiyama | ............... B62D 25/16 |
| 2010/0225141 A1* | 9/2010 | Mori | ...................... B60J 5/0429 |
| | | | 296/146.6 |
| 2010/0231003 A1* | 9/2010 | Okumura | ............. B62D 21/157 |
| | | | 296/193.06 |
| 2013/0328352 A1 | 12/2013 | Kato et al. | |

FOREIGN PATENT DOCUMENTS

| | | |
|---|---|---|
| JP | 2008-247139 A | 10/2008 |
| WO | 2012/081335 A1 | 6/2012 |

* cited by examiner

Vehicle-Body Front Side ⟷ Vehicle-Body Rear Side

Vehicle-Body Rear Side ←——→ Vehicle-Body Front Side

SIDE VEHICLE-BODY STRUCTURE OF AUTOMOTIVE VEHICLE

BACKGROUND OF THE INVENTION

The present invention relates to a side vehicle-body structure of an automotive vehicle which comprises a side door provided to open and close an entrance portion formed at a vehicle-body side face portion.

In the automotive vehicle provided with a rear side door to open and close an entrance portion for a rear seat, a peripheral portion of the rear-seat entrance portion at the vehicle-body side face portion serves as a door reception portion for receiving a peripheral portion of the rear side door from the inside. In this kind of vehicle, there have been conventionally provided various countermeasures for suppressing the rear side door from being deformed toward an inside of a cabin when the rear side door receives an impact load from a vehicle-body side or suppressing a rear body from being deformed toward the inside of the cabin when the rear body receives the impact load by way of the rear side door, thereby protecting a passenger seated in the rear seat.

Japanese Patent Laid-Open Publication No. H5-069859, for example, discloses a side vehicle-body structure comprising a reinforcing member (side sill reinforcement) which extends along a lower edge portion and a rear edge portion of an entrance portion for a rear seat. The reinforcing member comprises a straight portion extending in a vehicle longitudinal direction along the lower edge portion of the rear-seat entrance portion and a curve portion curving obliquely rearward and upward from a rear end of the straight portion along the rear edge portion of the rear-seat entrance portion and an upper face of a rear wheelhouse.

In the side vehicle-body structure of the above-described patent document, the lower edge portion of the rear-seat entrance portion is formed by a side sill. The above-described straight portion of the reinforcing member forms two closed cross sections therein by being interposed between a side sill inner and a side sill outer which constitute a side sill, and is joined to a lower end portion of a center pillar reinforcement at its front end portion. Further, a vehicle-body side face portion which forms the rear edge portion of the rear-seat entrance portion is comprised of a side outer panel as a vehicle-body outer panel exposed to the outside of a cabin and a side inner panel arranged inside of the side outer panel, and the curve portion of the above-described reinforcing member is provided between these panels. This curve portion is joined to an outside of the side inner panel, thereby forming a closed cross section together with the side inner panel, and joined to a suspension-housing reinforcement at its rear end portion.

The reinforcing member provided at the door reception portion of the vehicle body can disperse the impact load to various parts of the vehicle body by receiving the impact load inputted to the rear side door from the vehicle-body side and transmitting that to the center pillar reinforcement and the suspension-housing reinforcement, and can absorb an impact energy by being compressed and crushed in a vehicle width direction. Thus, load dispersion to the various parts of the vehicle body via the reinforcing member and impact absorption by deformation of the reinforcing member are performed compatibly, so that the rear side door can be effectively suppressed from coming in toward an inside of the cabin.

Further, Japanese Patent Laid-Open Publication No. 2008-081035 discloses a structure in which an engaging pin provided at a rear lower end portion of a rear side door and an engagement hole provided at a door reception portion on the vehicle-body side are engaged with each other when the rear side door is closed.

Since a move of the rear end portion of the rear side door which is engaged with the vehicle-body side relative to the vehicle body is limited as described above, deformation of the rear side door, such as the rear side door's coming in toward the inside of the cabin, can be restrained.

However, according to the structure disclosed in the above-described first patent document, only the single reinforcing member is joined to the vehicle-body outside of the side inner panel at the rear edge portion of the rear-seat entrance portion, so that it is difficult to compatibly achieve the load transmission performance and the impact absorption performance for the following reasons.

First, in a case in which the width, in the vehicle width direction, of the closed cross section formed between the side inner panel and the reinforcing member is shortened for the purpose of restraining buckling of the reinforcing member which may damage the load transmission performance, a width, in the vehicle width direction, of a gap formed between the side outer panel as the vehicle-body outer panel and the reinforcing member increases. Therefore, the amount of move of the rear side door which comes in toward the inside of the cabin from a point where the rear side door comes to contact the side outer panel to another point where the rear side door comes to contact the reinforcing member, without substantially crushing the reinforcing member, (insubstantial-stroke amount) increases. Further, the crushing amount of the reinforcing member in the vehicle width direction is limited, so that an impact absorption effect caused by crushing of the reinforcing member decreases.

To the contrary, in a case in which the width, in the vehicle width direction, of the closed cross section formed between the side inner panel and the reinforcing member is lengthened for the purpose of increasing the crushing amount of the reinforcing member, the reinforcing member tends to have buckling at a local portion, in a longitudinal direction, thereof. In particular, since a portion of the reinforcing member which contacts an impact bar provided at the rear side door locally receives a large load, the buckling tends to occur at this portion of the reinforcing member. This occurrence of the buckling of the reinforcing member damages the load transmission performance of the reinforcing member, so that the load dispersion to the various parts of the vehicle body is not performed effectively.

While some reinforcement countermeasures, such as increasing a plate thickness of the reinforcing member or adding a new reinforcement in the closed cross section, are further required in order to solve the above-described problem, there occurs a new problem that the weight of the vehicle body may increase improperly.

Further, in the structure disclosed in the above-described second patent document in which the rear door is suppressed from coming in toward the inside of the cabin by engagement of the rear side door with the door reception portion, some countermeasures, such as adding a new member for performing the energy absorption or the load transmission to the door reception portion, are required in order to absorb the impact energy or disperse the load to the parts of the vehicle body when the impact load is inputted from the vehicle-body side. This may cause an increase of the vehicle-body weight as well. Moreover, providing the engaging pin projecting toward the inside of the cabin at the rear side door may be inappropriate from a design perspective or the like.

SUMMARY OF THE INVENTION

Accordingly, an object of the present invention is to provide a side vehicle-body structure of an automotive vehicle which can compatibly improve the impact absorption and the load dispersion to various parts of the vehicle body when the impact load is inputted to the side door from the vehicle-body side.

The present invention is a side vehicle-body structure of an automotive vehicle, comprising a side door provided to open and close an entrance portion formed at a vehicle-body side face portion, an impact bar provided at the side door to extend in a vehicle longitudinal direction, a side inner panel forming the vehicle-body side face portion including a rear side of a peripheral portion of the entrance portion, a first reinforcing member provided to extend along the rear side of the peripheral portion of the entrance portion and joined to an outside of the side inner panel so as to form a first closed cross section together with the side inner panel, and a second reinforcing member joined to an outside of the first reinforcing member so as to form a second closed cross section together with the first reinforcing member, the second reinforcing member being configured to overlap with the impact bar, in a side view, when the side door closes the entrance portion.

Herein, the term of "overlap" which is used in the description of the present invention means that at least part of a member and at least part of another member overlap with each other.

According to the present invention, the first closed cross section formed between the side inner panel and the first reinforcing member and the second closed cross section formed between the first reinforcing member and the second reinforcing member are disposed between the side inner panel and the impact bar of the side door, so that the impact load inputted to the side door from the vehicle-body side is transmitted from the impact bar of the side door to the vehicle-body side including the side inner pane by way of the second reinforcing member and the first reinforcing member. Accordingly, compared with a case in which the single closed cross section is provided like the structure disclosed in the above-described first patent document, each width, in the vehicle width direction, of the first and second closed cross sections can be shortened properly and also the total of their widths can be ensured at an appropriate value.

Thus, since a yield strength against the load inputted from the vehicle-body side is increased by shortening the widths of the first and second closed cross sections, the first and second reinforcing members can be suppressed from having buckling at local portions, in the longitudinal direction, thereof. Thereby, the load transmission from the impact bar of the side door to the vehicle-body side including the side inner panel by way of the second reinforcing member and the first reinforcing member is performed properly, so that the load dispersion to the parts of the vehicle body can be performed properly.

Further, since the first and second reinforcing members do not easily crush in the vehicle width direction against the load inputted from the vehicle-body side as described above, the magnitude of the load which is necessary to crush these reinforcing members increases. Accordingly, the impact energy which can be absorbed with a specified crushing amount increases, so that the impact-energy absorption efficiency can improve.

Moreover, since the width, in the vehicle width direction, of a gap between the vehicle-body outer plate and the second reinforcing member is shortened by ensuring the appropriate total of the widths, in the vehicle width direction, of the first and second closed cross sections, the distance of an inward move from a point where the impact bar starts pressing the vehicle-body outer plate to another point where the impact bar starts pressing the second reinforcing member, without substantially crushing the reinforcing members, (the insubstantial-stroke amount) can be decreased. Further, since the total of the crushing amounts, in the vehicle width direction, of the first and second reinforcing members can be ensured sufficiently, the sufficient amount of the absorption of the impact energy through the crushing of these reinforcing members can be obtained. Thereby, the impact energy inputted to the side door from the vehicle-body side can be effectively absorbed through the crushing of the first and second reinforcing members.

As described above, the load dispersion to the parts of the vehicle body and the impact absorption through the crushing of the first and second reinforcing members can be compatibly performed effectively, so that the side door and vehicle-body members provided around the side door can be effectively suppressed from coming in toward the inside of the cabin, thereby effectively achieving the passenger's protection.

In an embodiment of the present invention, yield strength of the second reinforcing member against an impact load inputted from a vehicle-body side is higher than that of the first reinforcing member.

According to this embodiment, since the yield strength of the second reinforcing member against the impact load inputted from the vehicle-body side is higher than that of the first reinforcing member, the buckling of the second reinforcing member directly receiving the load from the impact bar can be suppressed effectively and also the efficiency of the energy absorption through the crushing of the second reinforcing member can be improved. Thus, the load transmission from the side door to the first reinforcing member by way of the second reinforcing member can be properly performed, and since the impact energy is absorbed efficiently by the second reinforcing member, the impact energy inputted to the first reinforcing member can be decreased easily, so that the buckling of the first reinforcing member can be suppressed effectively as well.

In another embodiment of the present invention, a load transmitting member connected to a vehicle-body structural member is joined to an outside of the side inner panel, and one end, in a longitudinal direction, of the first reinforcing member is joined to the load transmitting member. Herein, the above-described "vehicle-body structural member" means any member which constitutes the vehicle body, such as a roof side rail, a side inner panel, a rear wheelhouse outer.

According to this embodiment, since the impact load transmitted to the first reinforcing member from the side door by way of the second reinforcing member is transmitted to the side panel and also to another vehicle-body structural member than the side panel effectively by way of the load transmitting member joined to the outside of the side panel, the impact load inputted to the side door can be effectively dispersed to the parts of the vehicle body.

In another embodiment of the present invention, the second reinforcing member has a front face portion which faces forward in the vehicle longitudinal direction, and a bead extending in a vehicle width direction is provided at the front face portion of the second reinforcing member.

According to this embodiment, since the bead extending in the vehicle width direction is provided at the front face portion of the second reinforcing member, the yield strength of the front face portion against the load inputted from the vehicle-body side can be increased effectively. Therefore, the efficiency of the energy absorption through the crushing of the front face portion can be improved and also the performance of the load transmission from the second reinforcing member to the first reinforcing member can be improved by effectively suppressing the buckling of the front face portion.

In another embodiment of the present invention, at the front face portion of the second reinforcing member are provided a joint portion which is joined to a specified portion of the first reinforcing member so as to overlap with the specified portion and a projection portion which is configured to be continuous to the joint portion on an outward side, in the vehicle width direction, of the joint portion and project outward, in the vehicle width direction, from the specified portion of the first reinforcing member, and the bead is provided so as to extend over the joint portion and the projection portion.

According to this embodiment, since the bead is provided so as to extend over the joint portion and the projection portion at the front face portion of the second reinforcing member, the yield strength of the front face portion can be increased over the joint portion and the projection portion, so that the impact absorption performance and the load transmission performance of the second reinforcing member can be further improved.

In another embodiment of the present invention, the second reinforcing member has a side face portion which faces the impact bar, and a bead extending in a longitudinal direction of the first reinforcing member is provided at the side face portion of the second reinforcing member.

According to this embodiment, since the yield strength of the side face portion of the second reinforcing member is increased by the bead extending in the longitudinal direction of the first reinforcing member, the buckling of the side face portion is suppressed effectively, so that the appropriate load transmission to the first reinforcing member from the second reinforcing member can be performed.

Other features, aspects, and advantages of the present invention will become apparent from the following description which refers to the accompanying drawings.

DETAILED DESCRIPTION OF THE INVENTION

Hereafter, an embodiment of the present invention will be described specifically referring to the accompanying drawings. Herein, the terms of "front", "rear", "longitudinal", "right", "left", "lateral" and the like show respective directions when a forward traveling direction of a vehicle is considered as the "front" unless there is a special explanation.

Figure 1:
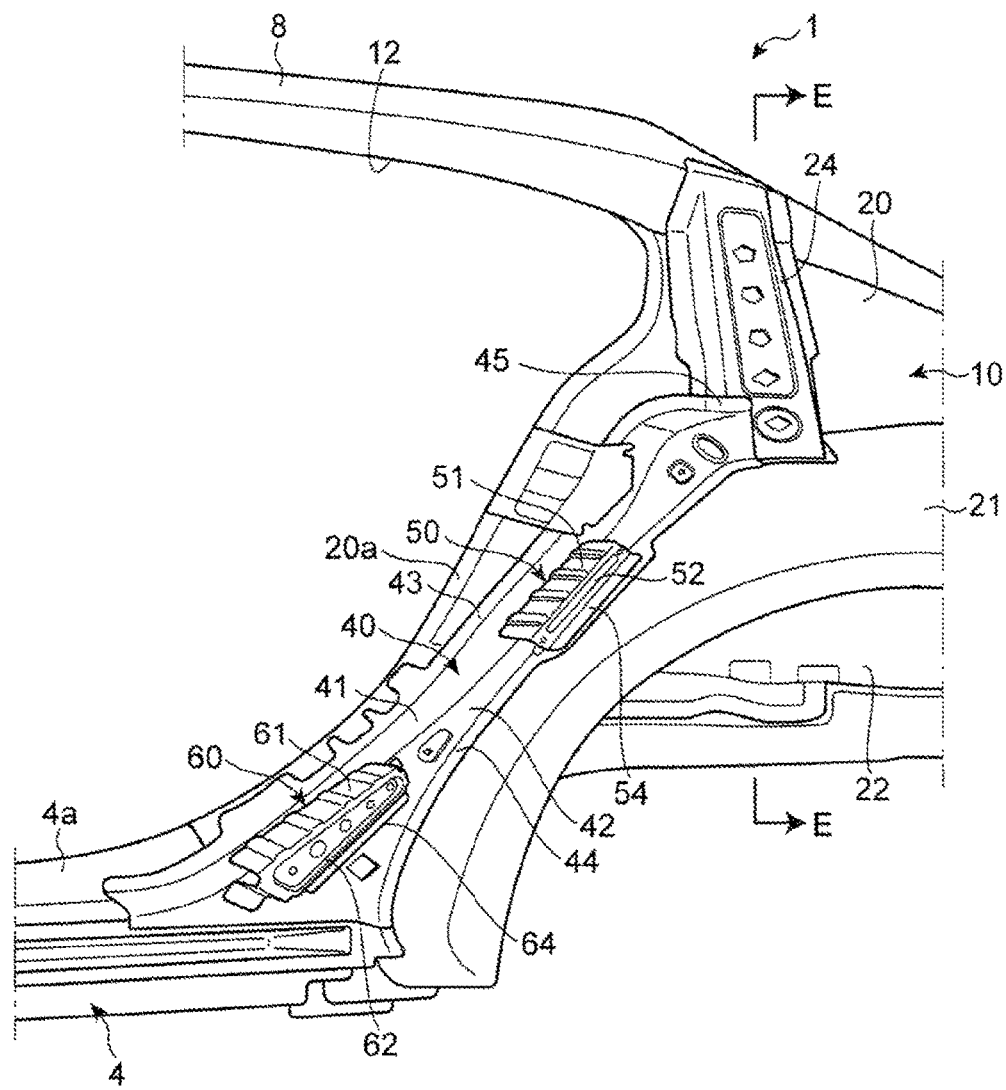
FIG. 1 is a perspective view of a rear edge portion of an entrance for a rear seat and its surrounding portion of a vehicle body of an automotive vehicle which is provided with a side vehicle-body structure according to an embodiment of the present invention, when viewed from an outside, in a vehicle width direction, of a cabin.
Figure 2:
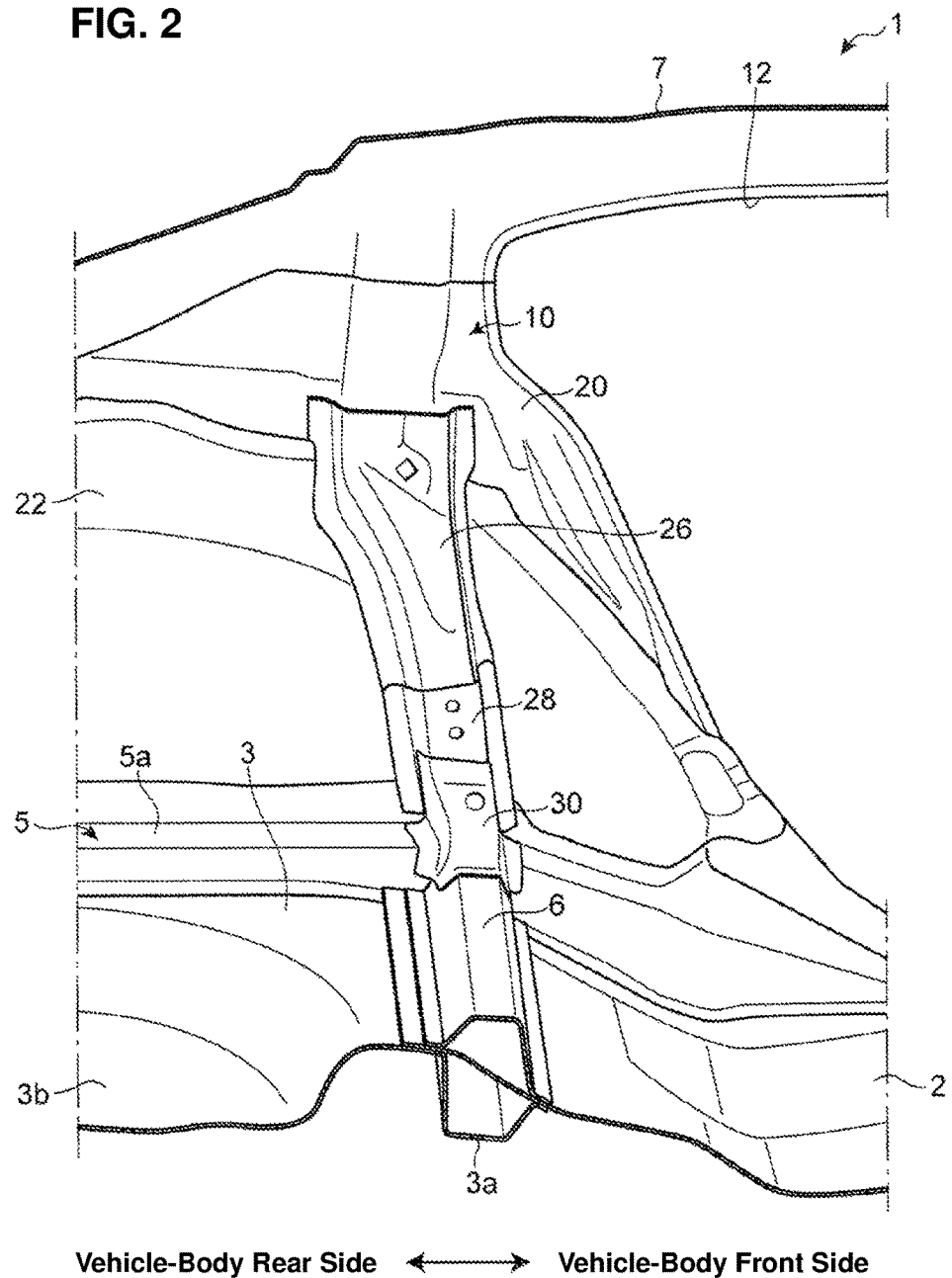
FIG. 2 is a perspective view of a vehicle-body part shown in FIG. 1, when viewed from an inside, in the vehicle width direction, of the cabin.
Figure 3:
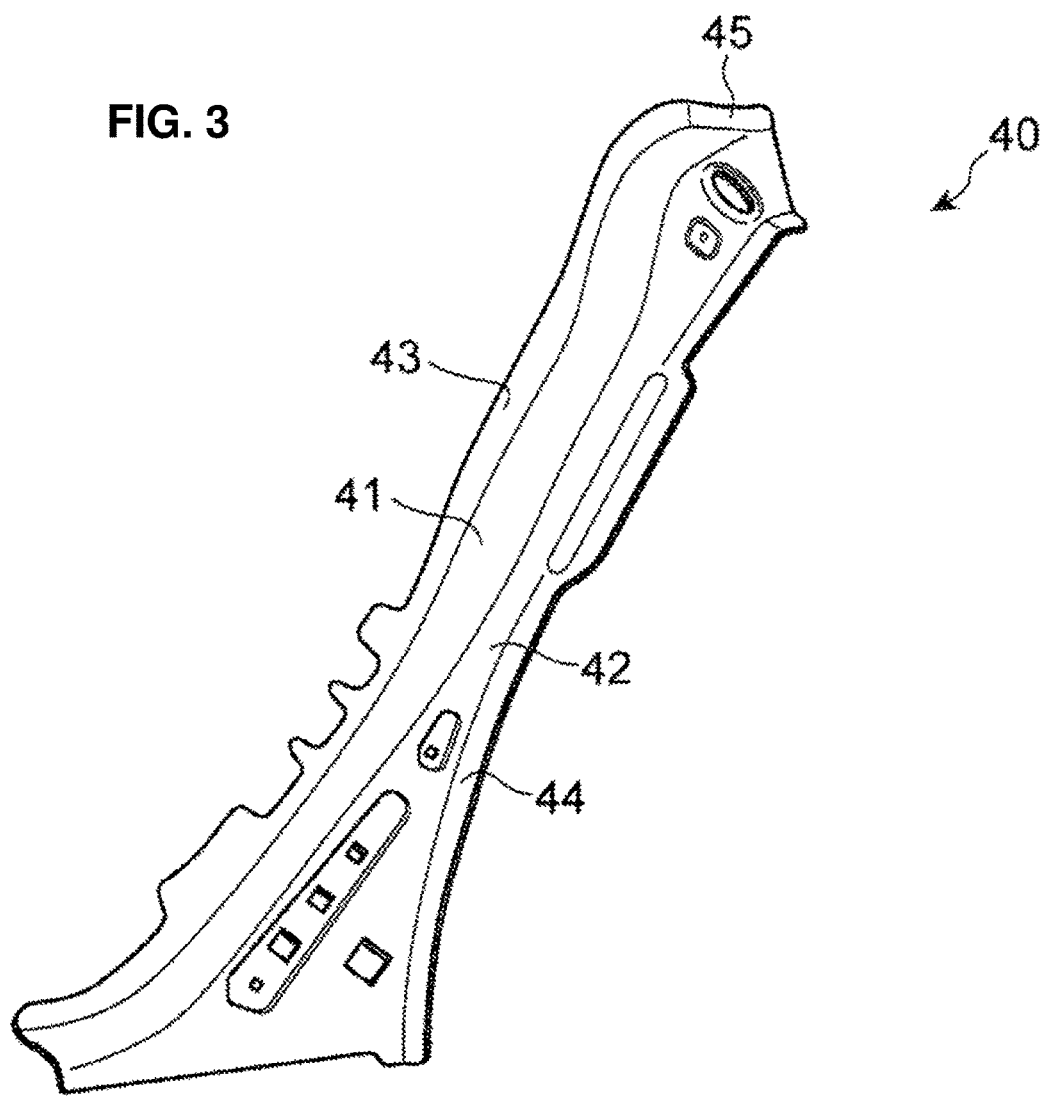
FIG. 3 is a perspective view of a first reinforcing member which is attached to the vehicle-body part shown in FIG. 1.
Figure 4:
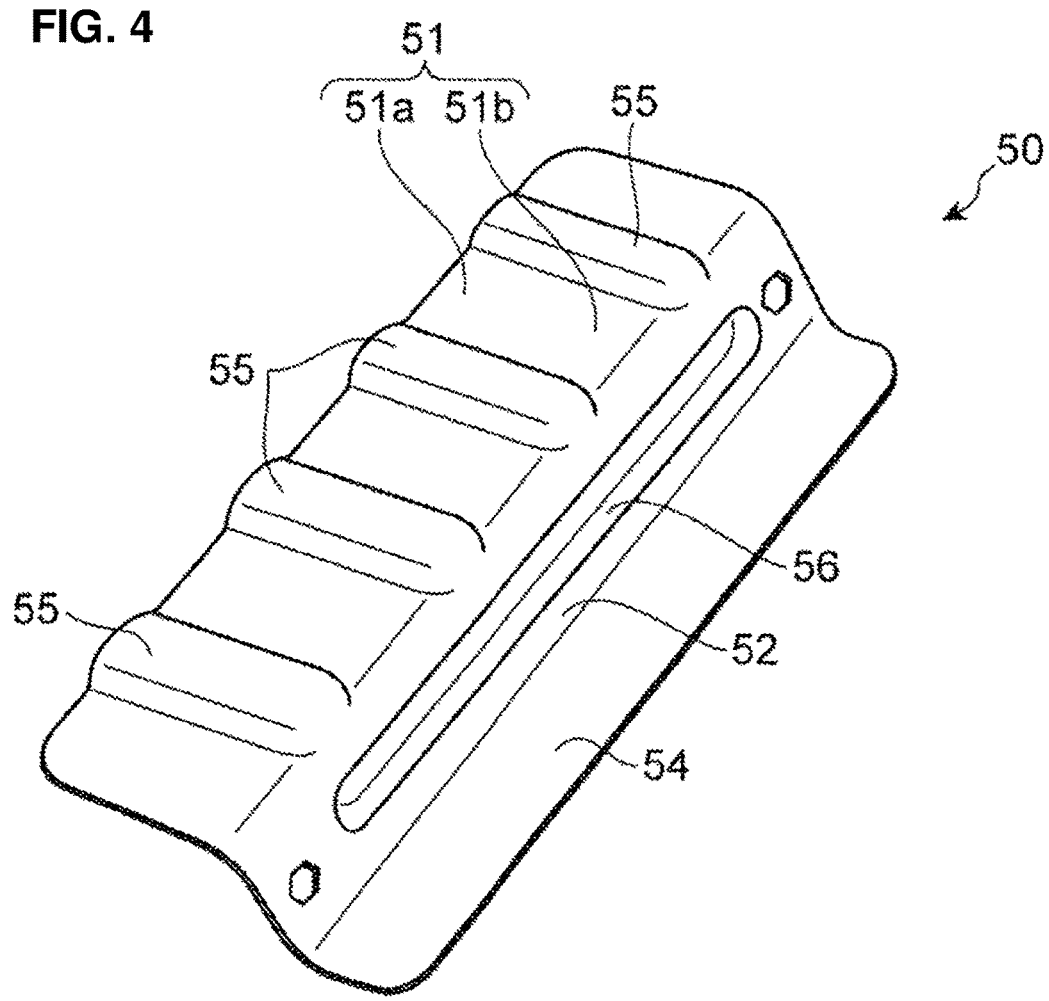
FIG. 4 is a perspective view of an upper-side second reinforcing member which is attached to the vehicle-body part shown in FIG. 1.
Figure 5A:
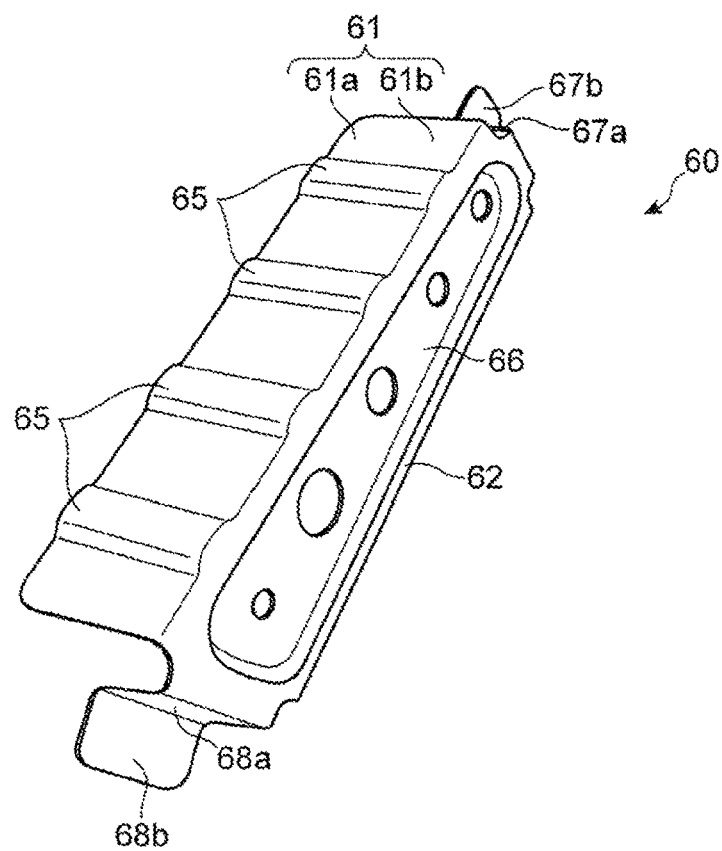
FIGS. 5A and 5B are perspective views of a lower-side second reinforcing member which is attached to the vehicle-body part shown in FIG. 1.
Figure 6:
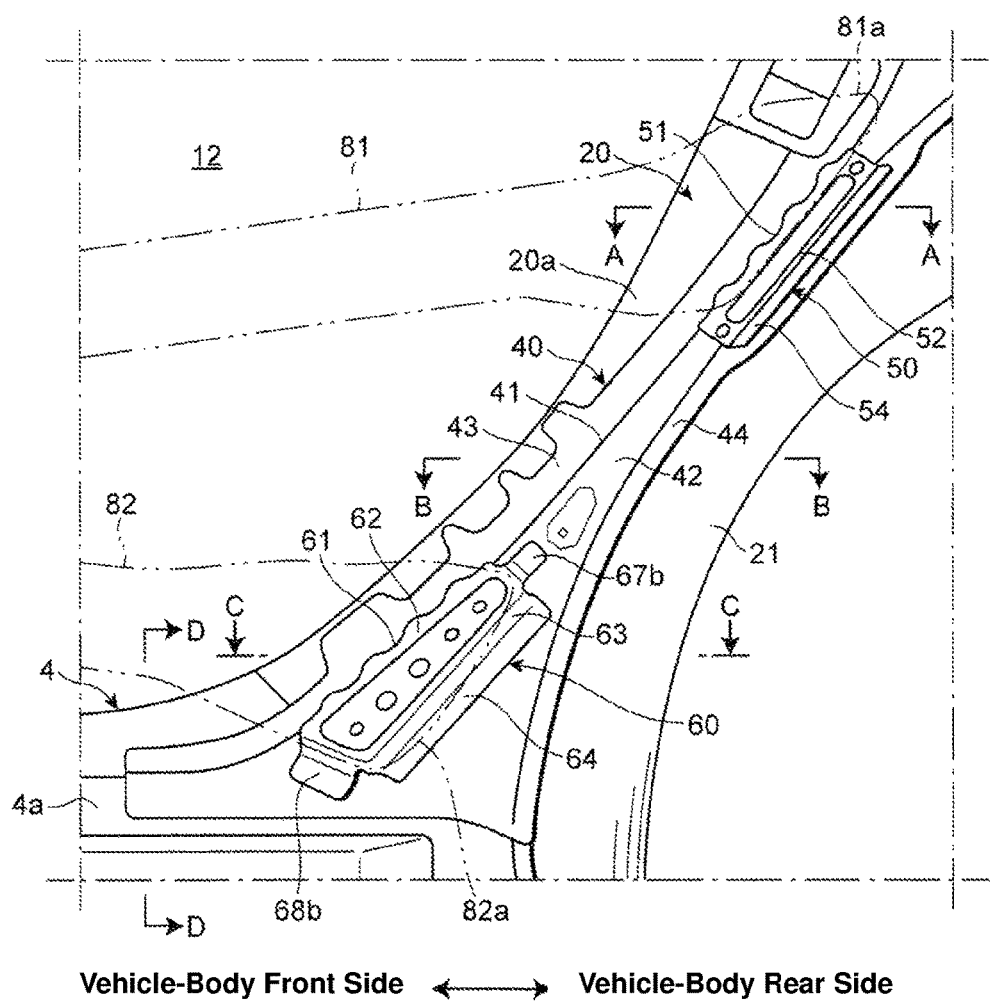
FIG. 6 is an enlarged side view of a major portion of the vehicle-body part shown in FIG. 1.
Figure 7:
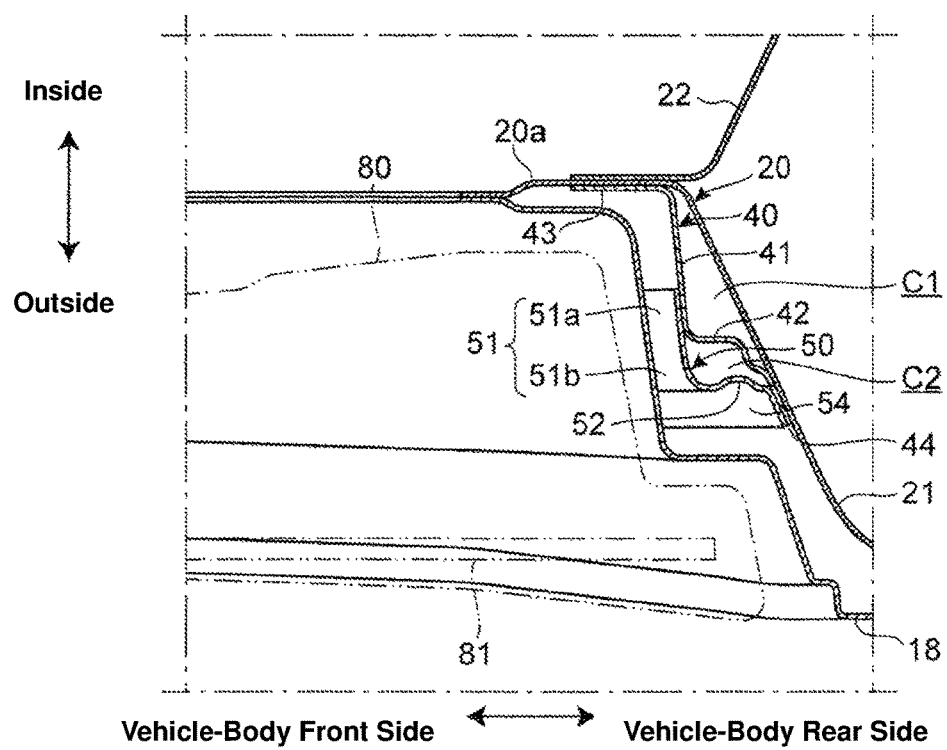
FIG. 7 is a sectional view taken along line A-A of FIG. 6, which shows a vehicle-body portion to which the first reinforcing member and the upper-side second reinforcing member are attached.
Figure 8:
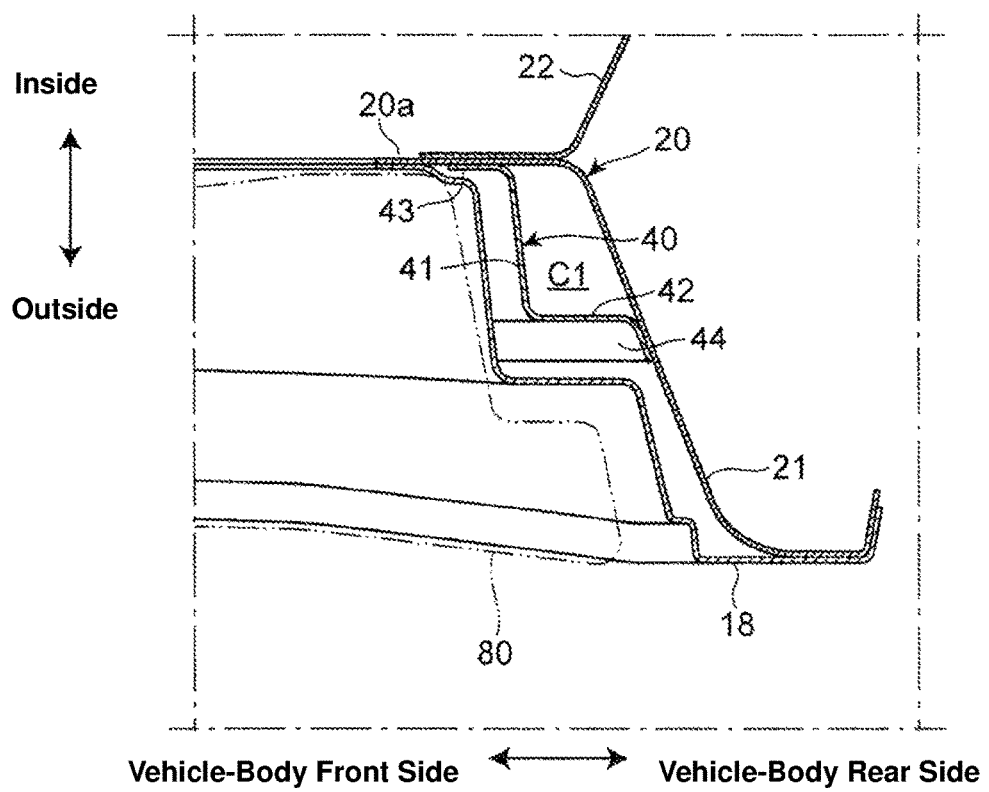
FIG. 8 is a sectional view taken along line B-B of FIG. 6, which shows a vehicle-body portion to which the first reinforcing member is attached.
Figure 9:
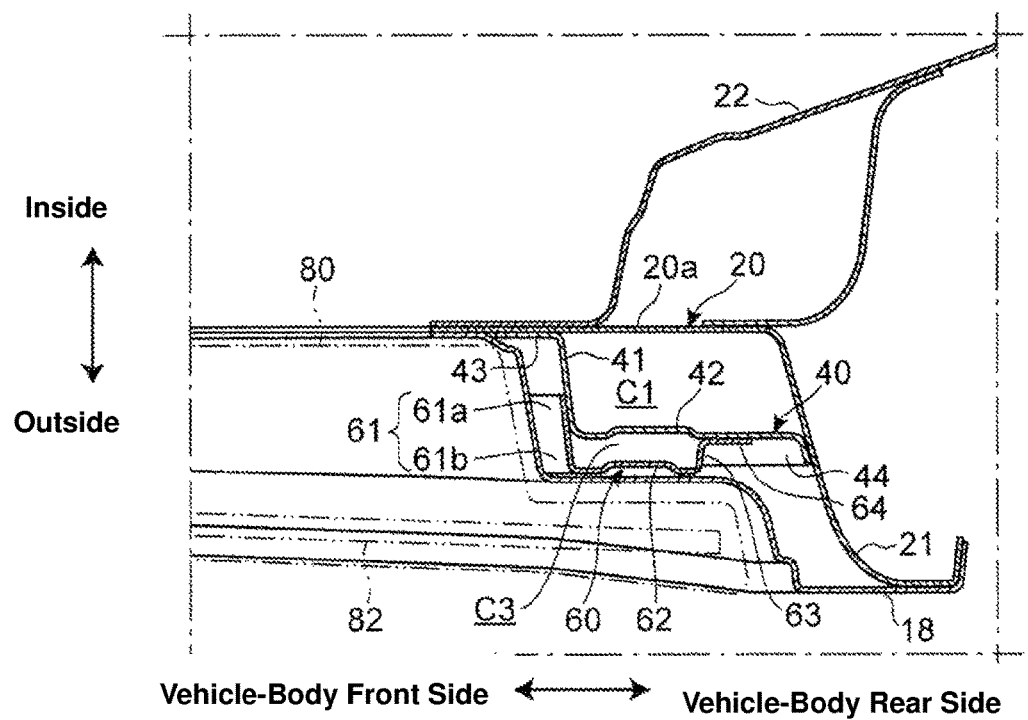
FIG. 9 is a sectional view taken along line C-C of FIG. 6, which shows a vehicle-body portion to which the first reinforcing member and the lower-side second reinforcing member are attached.
Figure 10:
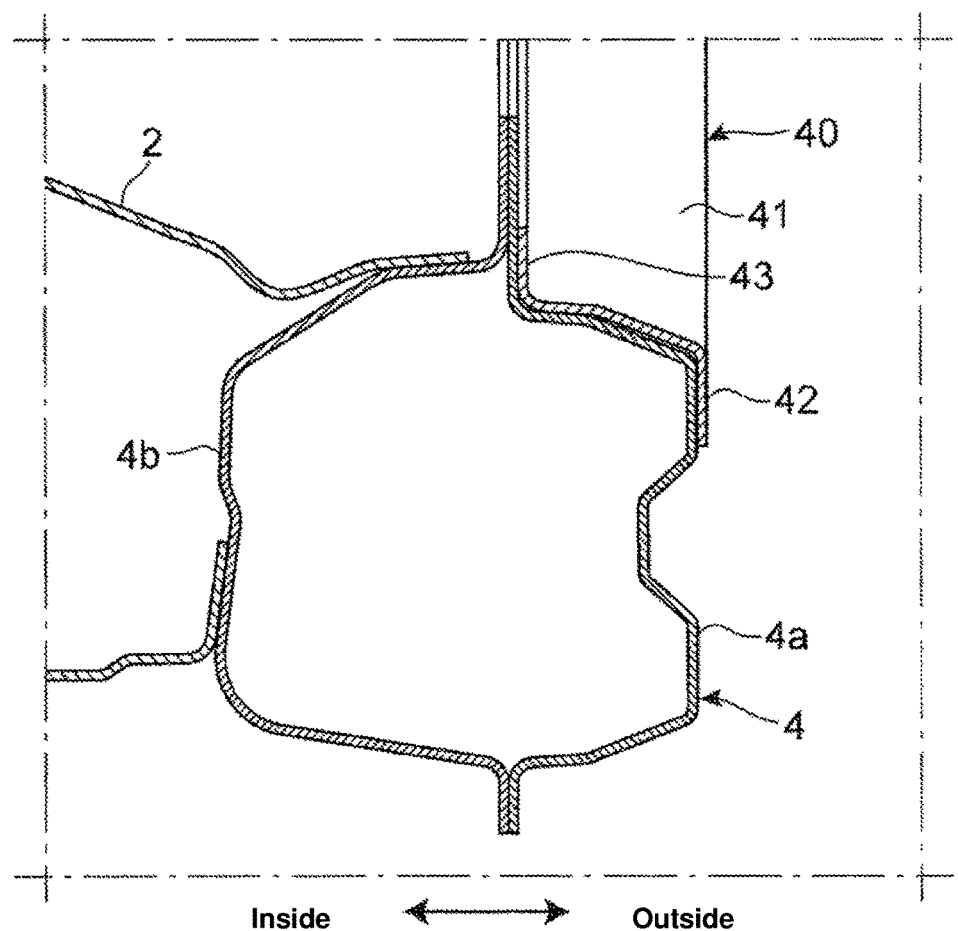
FIG. 10 is a sectional view taken along line D-D of FIG. 6, which shows a vehicle-body portion to which the first reinforcing member is attached.
Figure 11:
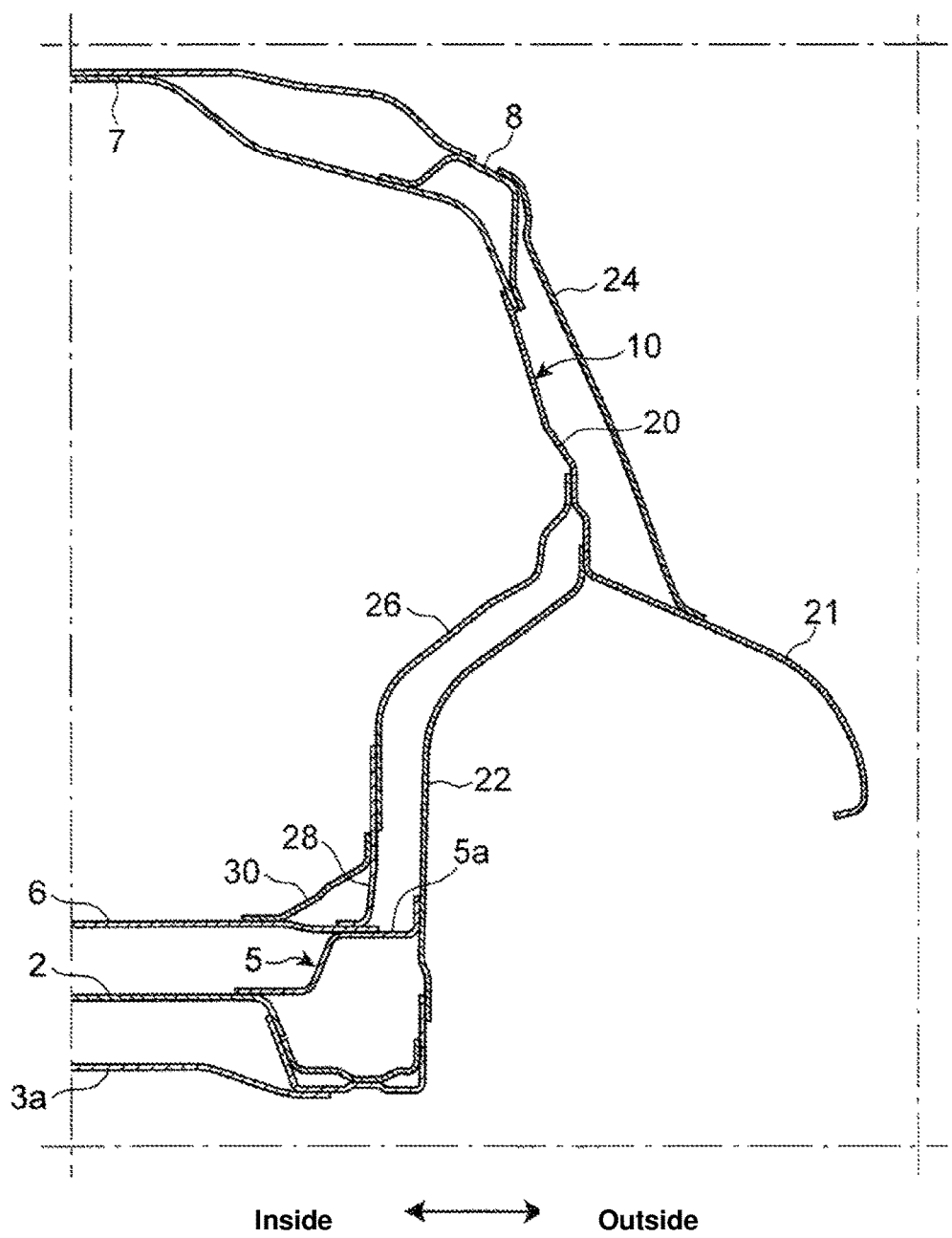
FIG. 11 is a sectional view taken along line E-E of FIG. 1, which shows a vehicle-body portion to which a suspension housing reinforcement is attached.

FIG. 1 is a perspective view of a rear edge portion of an entrance portion 12 for a rear seat and its surrounding portion of a vehicle body of an automotive vehicle 1 which is provided with a side vehicle-body structure according to an embodiment of the present invention, when viewed from an outside, in a vehicle width direction, of a cabin, and FIG. 2 is a perspective view of a vehicle-body part shown in FIG. 1, when viewed from an inside, in the vehicle width direction, of the cabin. FIGS. 3, 4 and 5A, B are respective perspective views of a first reinforcing member 40, an upper-side second reinforcing member 50, and a lower-side second reinforcing member 60, which will be described later. FIG. 6 is an enlarged side view of a major portion of the vehicle-body part shown in FIG. 1, FIG. 7 is a sectional view taken along line A-A of FIG. 6, FIG. 8 is a sectional view taken along line B-B of FIG. 6, FIG. 9 is a sectional view taken along line C-C of FIG. 6, FIG. 10 is a sectional view taken along line D-D of FIG. 6, and FIG. 11 is a sectional view taken along line E-E of FIG. 1.

In FIGS. 1, 6, 10 and 11, illustration of an outer panel which is exposed to the outside of the cabin is omitted.

As shown in FIGS. 1 and 2, the automotive vehicle 1 is a four-door hatch back type of vehicle, and an entrance portion for a front seat (not illustrated) and the rear-seat entrance portion 12 are provided at each of right-and-left vehicle-body side face portions of the vehicle.

The automotive vehicle 1 comprises a roof side rail 8 which extends in a vehicle longitudinal direction along an end portion, in the vehicle width direction, of a roof panel 7, a side sill 4 which extends in the vehicle longitudinal direction along an end portion, in the vehicle width direction, of a floor panel 2, a center pillar (not illustrated) which extends in a vehicle vertical direction between a longitudinally-central portion of the side sill 4 and the roof side rail 8, and a rear pillar 10 which extends in the vehicle vertical direction between a rear end portion of the side sill 4 and the roof side rail 8.

A peripheral portion of the rear-seat entrance portion 12 is formed by the roof side rail 8, the side sill 4, the center pillar, and the rear pillar 10. The peripheral portion of the rear-seat entrance portion 12 serves as a door reception portion to receive a peripheral portion of a rear side door 80 (see FIGS. 7-9) which opens and closes the rear-seat entrance portion 12.

The rear pillar 10 comprises a side inner panel (rear pillar inner) 20 and a side outer panel 18 (see FIGS. 7-9) as an outer panel which is provided on an outside of the cabin.

The side inner panel 20 is provided integrally with a rear wheelhouse outer 21 which protrudes outward at its lower end portion. As shown in FIGS. 7, 8 and 11, a peripheral portion of a rear wheelhouse inner 22 which protrudes inward is joined to an inside of a peripheral portion of the rear wheelhouse outer 21. The rear wheelhouse outer 21 and the rear wheelhouse inner 22 form a rear wheelhouse which accommodates a rear wheel therein.

As shown in FIG. 1, a suspension housing reinforcement 24 is joined to the outside of the side inner panel 20. The suspension housing reinforcement 24 has a hat-shaped cross section which extends in the vehicle vertical direction. This suspension housing reinforcement 24 is joined to an upper face portion of the rear wheelhouse outer 21 at its lower end portion and joined to the roof side rail 8 at its upper end portion.

As shown in FIGS. 2 and 11, a rear side frame 5 which extends in the vehicle longitudinal direction is arranged on the inside of a lower end portion of the rear wheelhouse inner 22. The rear side frame 5 is provided to extend rearward from a rear end portion of the side sill 4 (see FIG. 4) along an end portion, in the vehicle width direction, of the floor panel 2 and a rear floor panel 3 arranged in back of the floor panel 2.

A cross member 6 having a hat-shaped cross section extending in the vehicle width direction is provided to extend between the right-and-left rear side frames 5. The cross member 6 is joined to an upper face of the floor panel 2.

A reinforcement portion 3a having an inverse hat-shaped cross section extending in the vehicle width direction is integrally formed at a front end portion of the rear floor panel 3. The reinforcement portion 3a is provided along the cross member 6 below the floor panel 2 and joined to a lower face of the floor panel 2. A spare tire pan 3b is formed at a portion of the rear floor panel 3 which is positioned in back of the reinforcement portion 3a.

A side brace 26 is provided on the outside of the side housing reinforcement 24 such that the side inner panel 20 is interposed between the side brace 26 and the suspension housing reinforcement 24. The side brace 26 has a hat-shaped cross section extending in the vehicle vertical direction. While most part of the side brace 26 is joined to the inside of the rear wheelhouse inner 22, an upper end portion of the side brace 26 is joined to the inside of the side inner panel 20.

A lower end side of the side brace 26 is joined to a frame member 5a which forms an upper face portion of the rear side frame 5 via a first gusset 28. A second gusset 30 which extends between the first gusset 28 and the cross member 6 is joined to the frame member 5a. Thus, the side brace 26 is connected to the cross member 6 via the first gusset 28 and the second gusset 30.

As shown in FIGS. 1 and 6, the side inner panel 20 has an opening edge portion 20a which forms a rear-side peripheral portion of the rear-seat entrance portion 12 at a portion thereof which is located adjacent to a front side of the rear wheelhouse outer 21.

The first reinforcing member 40 provided to extend obliquely upward toward a vehicle-body rear side along the opening edge portion 20a is joined to the outside of the side inner panel 20.

As shown in FIG. 3, the first reinforcing member 40 comprises a front face portion 41 which is provided to face forward and a side face portion 42 which is provided to face outward in the vehicle width direction. An outward edge portion, in the vehicle width direction, of the front face portion 41 and a front edge portion of the side face portion 42 are continuous from each other, and a portion having an L-shaped cross section is formed by the front face portion 41 and the side face portion 42.

The front face portion 41 is provided to slant upward and rearward. An upper end side of the front face portion 41 is configured to slant upward gradually gently and an upper end of that becomes substantially horizontal. Likewise, a lower end side of the front face portion 41 is configured to slant downward gradually gently and a lower end of that becomes substantially horizontal. The side face portion 42 is configured in a shape such that its width becomes gradually wider toward its upper end side and its lower end side, which matches a shape of the rear wheelhouse outer 21.

The first reinforcing member 40 comprises a first flange portion 43 which projects forward from an inward edge portion, in the vehicle width direction, of the front face portion 41, a second flange portion 44 which projects outward from a rear edge portion of the side face portion 42, and a third flange portion 45 which projects upward from an upper edge portion of the front face portion 41. An upper end portion of the first flange portion 43 and an inward end portion, in the vehicle width direction, of the third flange portion 45 are continuous from each other.

As shown in FIGS. 1, 6-9, the first reinforcing member 40 is provided to extend between the opening edge portion 20a of the side inner panel 20 and the rear wheelhouse outer 21 along a ridge line between the opening edge portion 20a and the rear wheelhouse outer 21.

The first reinforcing member 40 is joined to the opening edge portion 20a of the side inner panel 20 at the first flange portion 43, and joined to the rear wheelhouse outer 21 at the second flange portion 44. An upper end portion of the first reinforcing member 40 is joined to a lower end portion of the suspension housing reinforcement 24 at the third flange portion 45. A lower end portion of the first reinforcing member 40 is joined to the side sill 4.

As shown in FIG. 10, the side sill 4 comprises a side sill outer 4a and a side sill inner 4b which are joined together so as to have a closed cross section continuously extending in the vehicle longitudinal direction, and the front face portion 41 and the side face portion 43 of the first reinforcing member 40 and a lower end portion of the first flange portion 43 are joined to an upper portion of the side sill outer 4a.

As shown in FIGS. 7-9, the front face portion 41 is spaced forward apart from the rear wheelhouse outer 21 of the side inner panel 20, and the side face portion 42 is spaced outward apart from the opening edge portion 20a of the side inner panel 20. Thus, a first closed cross section C1 which is continuous in a longitudinal direction of the first reinforcing member 40 is formed between the side inner panel 20 and the first reinforcing member 40.

The first closed cross section C1 is configured to extend over an entire length of the first reinforcing member 40. A longitudinal size (length) and an area of the first closed cross section C1 become greater toward a lower-end side of the first reinforcing member 40.

As shown in FIGS. 1, 6, 7 and 9, the two second reinforcing members 50, 60, for example, are joined to the outside of the first reinforcing member 40. These second reinforcing members 50, 60 are spaced apart from each other in a longitudinal direction of the first reinforcing member 40. The second reinforcing member 50, which is one of the second reinforcing members, is provided slightly on an upper side of a longitudinally-central portion of the first reinforcing member 40, and the other second reinforcing member 60 is provided near a lower end of the first reinforcing member 40.

As shown in FIG. 4, the upper-side second reinforcing member 50 comprises a front face portion 51 which is provided to face forward and a side face portion 52 which is provided to face outward. The front face portion 51 and the side face portion 52 are provided to extend obliquely upward and rearward. An outward edge portion, in the vehicle width direction, of the front face portion 51 and a front edge portion of the side face portion 52 are continuous from each other, and the front face portion 51 and the side face portion 52 form an L-shaped cross section together.

At the front face portion 51 are provided plural beads 55 which are arranged in the longitudinal direction of the front face portion 51, being spaced apart from each other. Each bead 55 is a projection portion extending in the vehicle width direction, and provided to extend over an entire width of the front face portion 51, for example. Thereby, the rigidity and the yield strength of the front face portion 51 against the load inputted from the vehicle-body side are increased. Accordingly, the rigidity and the yield strength of the second reinforcing member 50 against the impact load inputted from the vehicle-body side are higher than those of the first reinforcing member 40.

A bead 56 is provided at the side face portion 52 as well, which increases the face rigidity and the yield strength of the side face portion 52. The bead 56 is a recess groove which extends in the longitudinal direction of the side face portion 52. The bead 56 has a length which is almost equal to or longer than the distance between the uppermost bead 55 and the lowermost bead 55.

Further, the upper-side second reinforcing member 50 has a flange portion 54 which projects outward from a rear edge portion of the side face portion 52. Thus, the second reinforcing member 50 is of a crank shape having a Z-shaped cross section as a whole. The flange portion 54 is provided to extend over an entire length of the side face portion 52.

Figure 5B:
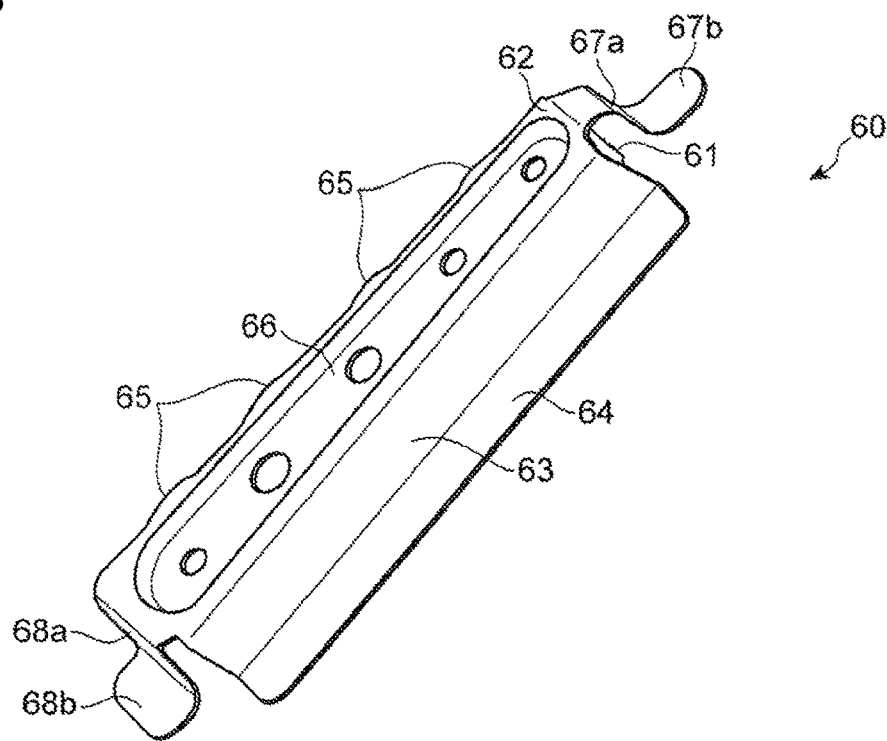

FIG. 5A is a perspective view of the lower-side second reinforcing member 60, when viewed obliquely from the vehicle-body front side and the vehicle-body upper side, and FIG. 5B is a perspective view of the lower-side second reinforcing member 60, when viewed obliquely from the vehicle-body rear side and the vehicle-body lower side. As shown in FIGS. 5A and 5B, the lower-side second reinforcing member 60 comprises a front face portion 61 which is provided to face forward, a side face portion 62 which is provided to face outward, and a rear face portion 63 which is provided to face rearward. The front face portion 61, the side face portion 62, and the rear face portion 63 are provided to extend obliquely upward and rearward.

An outward edge portion, in the vehicle width direction, of the front face portion 61, a rear edge portion of the side face portion 62, and an outward edge portion, in the vehicle width direction, of the rear face portion 63 are continuous from each other. Further, a first flange portion 64 which projects rearward is continuous to an inward edge portion, in the vehicle width direction, of the rear face portion 63. The first flange portion 64 is provided to extend over an entire length of the rear face portion 63. Thus, the lower-side second reinforcing member 60 is configured to have a hat-shaped cross section as a whole.

At the front face portion 61 are provided plural beads 65 which are arranged in the longitudinal direction of the front face portion 61, being spaced apart from each other. Each bead 65 is a projection portion extending in the vehicle width direction, and provided to extend over an entire width of the front face portion 61, for example. Thereby, the rigidity and the yield strength of the front face portion 61 against the load inputted from the vehicle-body side are increased. Accordingly, the rigidity and the yield strength of the second reinforcing member 60 against the impact load inputted from the vehicle-body side are higher than those of the first reinforcing member 40.

A bead 66 is provided at the side face portion 62 as well, which increases the face rigidity and the yield strength of the side face portion 62. The bead 66 is a recess groove which extends in the longitudinal direction of the side face portion 62. The bead 66 has a length which is almost equal to or longer than the distance between the uppermost bead 65 and the lowermost bead 65.

Further, the lower-side second reinforcing member 60 integrally has an extension portion 67a which extends inward from an upper edge portion of the side face portion 62, a second flange portion 67b which extends upward from a tip of the extension portion 67a, an extension portion 68a which extends inward from a lower edge portion of the side face portion 62, and a third flange portion 68b which extends downward from a tip of the extension portion 68a.

As shown in FIGS. 1, 6 and 7, the upper-side second reinforcing member 50 is joined to the front face portion 41 of the first reinforcing member 40 at the front face portion 51 and joined to the second flange portion 44 of the first reinforcing member 40 at the flange portion 54. The front face portion 51 of the second reinforcing member 50 comprises a joint portion 51a which is joined so as to overlap with the front face portion 41 of the first reinforcing member 40 and a projection portion 51b which is configured to be continuous to the joint portion 51a on an outward side, in the vehicle width direction, of the joint portion 51a and project outward, in the vehicle width direction, from the front face portion 41 of the first reinforcing member 40.

The side face portion 52 of the second reinforcing member 50 is spaced outward apart from the side face portion 42 of the first reinforcing member 40. Thus, a second closed cross section C2 which is continuous in a longitudinal direction of the second reinforcing member 50 is formed between the first reinforcing member 40 and the second reinforcing member 50. The second closed cross section C2 has a narrower width, in the vehicle width direction, than the first closed cross section C1, and an area of the second closed cross section C2 is smaller than that of the first closed cross section C1. The second closed cross section C2 is formed over an entire length of the second reinforcing member 50.

As shown in FIGS. 1, 6 and 9, the lower-side second reinforcing member 60 is joined to the front face portion 41 of the first reinforcing member 40 at the front face portion 61 and joined to the side face portion 42 of the first reinforcing member 40 at the first flange portion 64. The front face portion 61 of the second reinforcing member 60 comprises a joint portion 61a which is joined so as to overlap with the front face portion 41 of the first reinforcing member 40 and a projection portion 61b which is configured to be continuous to the joint portion 61a on an outward side, in the vehicle width direction, of the joint portion 61a and project outward, in the vehicle width direction, from the front face portion 41 of the first reinforcing member 40.

The side face portion 62 of the second reinforcing member 60 is spaced outward apart from the side face portion 42 of the first reinforcing member 40. Thus, another second closed cross section C3 which is continuous in a longitudinal direction of the second reinforcing member 60 is formed between the first reinforcing member 40 and the second reinforcing member 60. The second closed cross section C3 has a narrower width, in the vehicle width direction, and a shorter length, in the vehicle longitudinal direction, than those of the first closed cross section C1, and an area of the second closed cross section C3 is smaller than that of the first closed cross section C1. The second closed cross section C3 is formed over an entire length of the second reinforcing member 60.

FIG. 6 illustrates positions of impact bars 81, 82 in a state in which the rear side door 80 (see FIGS. 7-9) is closed with two-dotted broken lines. The two impact bars 81, 82 are provided inside the rear side door 80 to be spaced vertically apart from each other, for example, and these impact bars 81, 82 extend in the vehicle longitudinal direction. The impact bars 81, 82 respectively include rear end portions 81a, 82a, each of which has a wider width, in the vehicle vertical direction, than a central portion, in the longitudinal direction, thereof, and these rear end portions 81a, 82a are configured to overlap with the opening edge portion 20a of the side inner panel 20 in the side view. Thereby, the rear side door 80 can be suppressed from being deformed when the impact load is inputted from the vehicle-body side.

The upper-side and lower-side second reinforcing members 50, 60 are arranged, in the following manner, relative to the above-described impact bars 81, 82 in a state in which the rear side door 80 is closed.

The side face portion 52 of the upper-side second reinforcing member 50 is provided to overlap with the rear end portion 81a of the impact bar 81 both in the vehicle longitudinal direction and in the vehicle vertical direction. Thereby, the rear end portion 81a of the impact bar 81 and the side face portion 52 of the second reinforcing member 50 overlap with each other in the side view. The side face portion 52 has substantially the same size, in its longitudinal direction, as the rear end portion 81a of the impact bar 81, and overlaps with the rear end portion 81a of the impact bar 81 over its roughly entire length in the side view.

The side face portion 62 of the lower-side second reinforcing member 60 is provided to overlap with the rear end portion 82 of the impact bar 82 both in the vehicle longitudinal direction and in the vehicle vertical direction. Thereby, the rear end portion 82a of the impact bar 82 and the side face portion 62 of the second reinforcing member 60 overlap with each other in the side view. The side face portion 62 has substantially the same size, in its longitudinal direction, as the rear end portion 82a of the impact bar 82, and overlaps with the rear end portion 82a of the impact bar 82 over its roughly entire length in the side view.

Thus, the side face portions 52, 62 of the second reinforcing members 50, 60 are provided to face the rear end portions 81a, 82a of the impact bars 81, 82 such that the side outer panel 18 (see FIGS. 7 and 9) is interposed between the side face portions 52, 62 and the impact bars 81, 82. Accordingly, when the impact load is inputted to the rear side door 80 from the vehicle-body side, the impact bars 81, 82 of the rear side door 80 are received by the second reinforcing members 50, 60. Further, since the second reinforcing members 50, 60 are joined to the first reinforcing member 40 as described above, the impact load inputted to the rear side door 80 from the vehicle-body side is transmitted to the first reinforcing member 40 from the impact bars 81, 82 of the rear side door 80 by way of the second reinforcing members 50, 60.

Herein, the above-described beads 55, 65 (see FIGS. 4 and 5) are provided at the front face portions 51, 61 of the second reinforcing members 50, 60 to extend from the joint portions 51a, 61a to the projection portions 51b, 61b, so that the yield strength of the front face portions 51, 61 against the load inputted from the vehicle-body side is increased effectively over an entire face. Accordingly, the front face portions 51, 61 are not crushed easily by the impact load transmitted from the impact bars 81, 82.

Further, the face rigidity and the yield strength of the side face portions 52, 62 of the second reinforcing members 50, 60 are increased by the above-described beads 56, 66 (see FIGS. 4 and 5) extending in the longitudinal direction of the first reinforcing member 40.

Accordingly, when the impact load is inputted from the vehicle-body side, the buckling of the front face portions 51, 61 and the side face portions 52, 62 of the second reinforcing member 50, 60 can be suppressed effectively, thereby achieving the load transmission to the first reinforcing member 40 from the second reinforcing members 50, 60.

Further, as shown in FIGS. 7 and 9, since the first closed cross section C1 and the second closed cross sections C2, C3 are provided between the side inner panel 20 and the impact bars 81, 82, compared with a case in which the single closed cross section is provided like the conventional structure, each width, in the vehicle width direction, of the closed cross sections C1, C2, C3 can be shortened properly and also the total of their widths can be ensured at an appropriate value.

Thus, since the yield strength against the load inputted from the vehicle-body side is increased by shortening the widths of the first and second closed cross sections C1, C2, C3, the first and second reinforcing members 40, 50, 60 can be suppressed from having buckling at local portions, in the longitudinal direction, thereof. In particular, the second reinforcing members 50, 60 which directly receive the load from the impact bars 81, 82 have the higher yield strength against the impact load inputted from the vehicle-body side than the first reinforcing member 40, so that the bucking can be more effectively suppressed. Thereby, the load transmission from the rear side door 80 to the first reinforcing member 40 by way of the second reinforcing members 50, 60 can be performed properly.

Further, since the bucking of the first reinforcing member 40 is suppressed as described above, the impact load transmitted from the rear side door 80 to the first reinforcing member 40 by way of the second reinforcing members 50, 60 can be dispersed to the various parts of the vehicle body from the first reinforcing member 40.

Specifically, the impact load is dispersed from the first reinforcing member 40 to a large-area portion of the side inner panel 20, and also transmitted to the suspension housing reinforcement 24 (see FIG. 1) connected to the upper end portion of the first reinforcing member 40 and the side sill 4 (see FIG. 1) connected to the lower end portion of the first reinforcing member 40 by way of the first closed cross section C1 formed between the side inner panel 20 and the first reinforcing member 40.

Herein, since the second reinforcing members 50, 60 are disposed separately above and below a longitudinal center of the first reinforcing member 40, the load transmission to both an upper side and a lower side by way of the first closed cross section C1 can be performed effectively, thereby performing the load dispersion to the various parts of the vehicle body more properly.

As shown in FIGS. 2 and 11, the impact load transmitted to the suspension housing reinforcement 24 from the first closed cross section C1, is transmitted to the cross member 6 by way of the side inner panel 20, the side brace 26, and the first and second gussets 28, 30, for example. Further, the load transmission from the suspension housing reinforcement 24 by way of the side brace 26 and others and the load transmission from the suspension housing reinforcement 24 to the roof side rail 8 are performed. Moreover, the impact load transmitted to the side sill 4 from the first closed cross section C1 is transmitted to another cross member (not illustrated) which is provided to extend between the right- and-left side sills 4. Thus, the impact load inputted to the rear side door 80 from the vehicle-body side is effectively dispersed to the various parts of the vehicle body.

Moreover, the width, in the vehicle width direction, of a gap between the side outer panel 18 as the vehicle-body outer plate and the side face portions 52, 62 of the second reinforcing members 50, 60 can be shortened by ensuring the appropriate total of the widths, in the vehicle width direction, of the first and second closed cross sections C1, C2, C3. Thereby, the distance of an inward move from a point where the rear end portions 81a, 82a of the impact bars 81, 82 start pressing the side outer panel 18 to another point where the rear end portions 81a, 82a of the impact bars 81, 82 start pressing the second reinforcing members 50, 60, that is, the distance of the inward move from the point where the impact bars 81, 82 start contacting the vehicle body, without substantially crushing the reinforcing members, (the insubstantial-stroke amount) can be decreased.

Further, since the widths, in the vehicle width direction, of the first and second closed cross sections C1, C2, C3 are shortened, the first and second reinforcing members 40, 50, 60 are not crushed easily in the vehicle width direction. Accordingly, the amount of load which is necessary to crush the reinforcing members 40, 50, 60 increases, so that the impact energy which can be absorbed through a specified crushing amount increases at the reinforcing members 40, 50, 60, thereby increasing the efficiency of the impact energy absorption.

In particular, since the yield strength of the second reinforcing members 50, 60 against the impact load inputted from the vehicle-body side is higher than that of the first reinforcing member 40, the higher energy-absorption efficiency can be provided. Thus, the impact energy is absorbed efficiently by the second reinforcing members 50, 60, so that the impact energy inputted to the first reinforcing member 40 can be decreased easily, thereby more effectively suppressing the buckling of the first reinforcing member 40.

Moreover, since the total widths, in the vehicle width direction, of the first closed cross section C1 and the second closed cross sections C2, C3 are ensured as described above, the total of the crushing amounts, in the vehicle width direction, of the first reinforcing member 40 and the second reinforcing members 50, 60 can be ensured sufficiently, so that the sufficient amount of the absorption of the impact energy through the crushing of these reinforcing members 40, 50, 60 can be obtained. Thereby, the impact energy inputted to the rear side door 80 from the vehicle-body side can be effectively absorbed through the crushing of the first and second reinforcing members 40, 50, 60.

As described above, the load dispersion to the parts of the vehicle body and the impact absorption through the crushing of the first and second reinforcing members 40, 50, 60 can be compatibly performed effectively, so that the rear side door 80 and vehicle-body members provided around the rear side door 80 can be effectively suppressed from coming in toward the inside of the cabin, thereby effectively achieving the passenger's protection.

While having been described referring to the above-described embodiment, the present invention should not be limited to the embodiment.

For example, while the above-described embodiment explained an example of the side vehicle-body structure of the four-door type hatch back vehicle, the present invention is applicable to any type of automotive vehicle provided with the entrance portions at the side face portion of the vehicle body.

What is claimed is:

1. A side vehicle-body structure of an automotive vehicle, comprising:
    a side door provided to open and close an entrance portion formed at a vehicle-body side face portion;
    an impact bar provided at the side door to extend in a vehicle longitudinal direction;
    a side inner panel forming the vehicle-body side face portion including a rear side of a peripheral portion of the entrance portion;
    a first reinforcing member provided to extend along the rear side of the peripheral portion of the entrance portion and joined to an outside of the side inner panel so as to form a first closed cross section together with the side inner panel; and
    a second reinforcing member joined to an outside of the first reinforcing member so as to form a second closed cross section together with the first reinforcing member,
    wherein said second closed cross section formed between the first reinforcing member and the second reinforcing member is provided to be piled, in a vehicle width direction, on said first closed cross section formed between the side inner panel and the first reinforcing member such that the second closed cross section is positioned on an outward side, in the vehicle width direction of the first closed cross section, and
    said first and second reinforcing members are both provided to overlap with a rear end of said impact bar both in the vehicle longitudinal direction and in a vehicle vertical direction when the side door closes the entrance portion such that an impact load inputted from a vehicle-body side is transmitted to both the first and second reinforcing members via the impact bar and causes the first and second closed cross sections of the first and second reinforcing members to be crushed in the vehicle width direction.

2. The side vehicle-body structure of the automotive vehicle of claim 1, wherein yield strength of said second reinforcing member against the impact load inputted from the vehicle-body side is higher than that of said first reinforcing member.

3. The side vehicle-body structure of the automotive vehicle of claim 1, wherein a load transmitting member connected to a vehicle-body structural member is joined to an outside of said side inner panel; and one end, in a longitudinal direction, of said first reinforcing member is joined to said load transmitting member.

4. The side vehicle-body structure of the automotive vehicle of claim 2, wherein a load transmitting member connected to a vehicle-body structural member is joined to an outside of said side inner panel, and one end, in a longitudinal direction, of said first reinforcing member is joined to said load transmitting member.

5. The side vehicle-body structure of the automotive vehicle of claim 1, wherein said second reinforcing member has a front face portion which faces forward in the vehicle longitudinal direction, and a bead extending in a vehicle width direction is provided at said front face portion of the second reinforcing member.

6. The side vehicle-body structure of the automotive vehicle of claim 2, wherein said second reinforcing member has a front face portion which faces forward in the vehicle longitudinal direction, and a bead extending in a vehicle width direction is provided at said front face portion of the second reinforcing member.

7. The side vehicle-body structure of the automotive vehicle of claim 3, wherein said second reinforcing member has a front face portion which faces forward in the vehicle longitudinal direction, and a bead extending in a vehicle width direction is provided at said front face portion of the second reinforcing member.

8. The side vehicle-body structure of the automotive vehicle of claim 4, wherein said second reinforcing member has a front face portion which faces forward in the vehicle longitudinal direction, and a bead extending in a vehicle width direction is provided at said front face portion of the second reinforcing member.

9. The side vehicle-body structure of the automotive vehicle of claim 8, wherein at said front face portion of the second reinforcing member are provided a joint portion which is joined to a specified portion of said first reinforcing member so as to overlap with the specified portion and a projection portion which is configured to be continuous to said joint portion on an outward side, in the vehicle width direction, of the joint portion and project outward, in the vehicle width direction, from said specified portion of the first reinforcing member, and said bead is provided so as to extend over said joint portion and said projection portion.

10. The side vehicle-body structure of the automotive vehicle of claim 1, wherein said second reinforcing member has a side face portion which faces said impact bar, and a bead extending in a longitudinal direction of said first reinforcing member is provided at said side face portion of the second reinforcing member.

11. The side vehicle-body structure of the automotive vehicle of claim 2, wherein said second reinforcing member has a side face portion which faces said impact bar, and a bead extending in a longitudinal direction of said first reinforcing member is provided at said side face portion of the second reinforcing member.

12. The side vehicle-body structure of the automotive vehicle of claim 3, wherein said second reinforcing member has a side face portion which faces said impact bar, and a bead extending in a longitudinal direction of said first reinforcing member is provided at said side face portion of the second reinforcing member.

13. The side vehicle-body structure of the automotive vehicle of claim 5, wherein said second reinforcing member has a side face portion which faces said impact bar, and a bead extending in a longitudinal direction of said first reinforcing member is provided at said side face portion of the second reinforcing member.

14. The side vehicle-body structure of the automotive vehicle of claim 9, wherein said second reinforcing member has a side face portion which faces said impact bar, and a bead extending in a longitudinal direction of said first reinforcing member is provided at said side face portion of the second reinforcing member.

15. The side vehicle-body structure of the automotive vehicle of claim 1, wherein said second reinforcing member comprises plural members which are provided to be spaced apart from each other in the vehicle vertical direction.

16. The side vehicle-body structure of the automotive vehicle of claim 1, wherein said first reinforcing member is provided to extend in the vehicle longitudinal direction between said entrance portion and a wheel house.

17. The side vehicle-body structure of the automotive vehicle of claim 3, wherein said vehicle-body structural member where said load transmitting member is connected is a roof side rail which extends in the vehicle longitudinal direction at an upper end portion of the vehicle, and the other end, in the longitudinal direction, of said first reinforcing member is joined to a side sill which extends in the vehicle longitudinal direction at a lower end portion of the vehicle.

* * * * *